No. 607,143. Patented July 12, 1898.
A. M. STOLTZ.
APPARATUS FOR HEATING AND MOISTENING SOIL.
(Application filed Apr. 19, 1897.)
(No Model.)
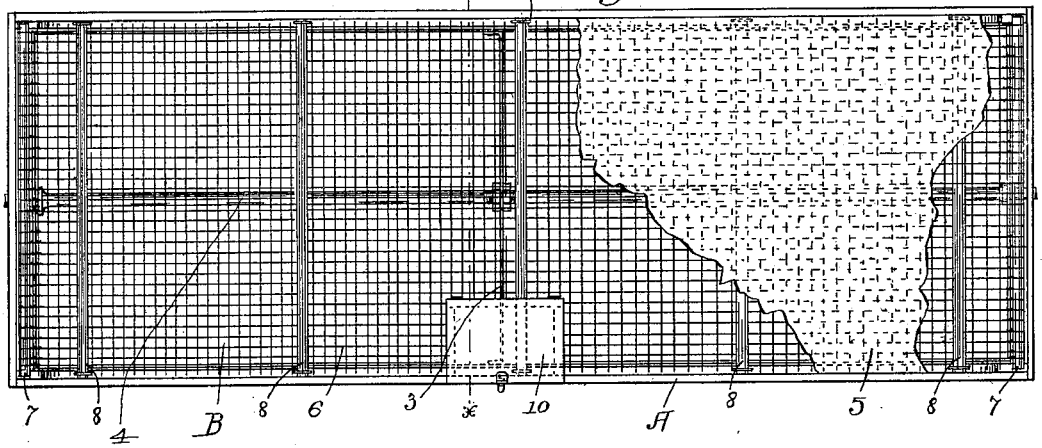
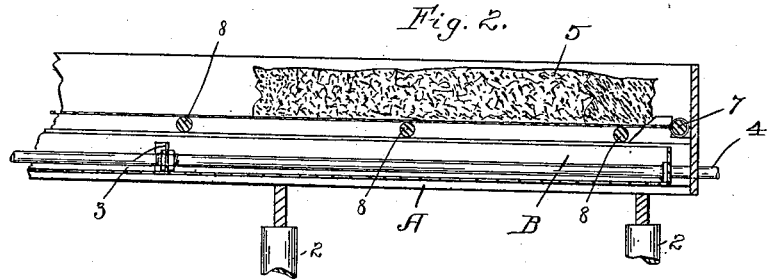
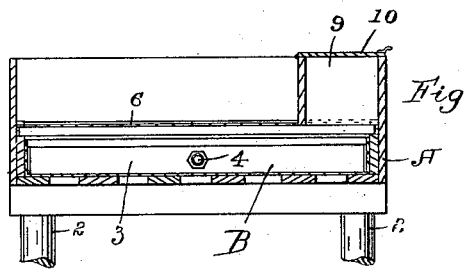
Witnesses:
Inventor:
Anthony M. Stoltz.
per: Attorney.

UNITED STATES PATENT OFFICE.

ANTHONY M. STOLTZ, OF ST. PAUL, MINNESOTA.

APPARATUS FOR HEATING AND MOISTENING SOIL.

SPECIFICATION forming part of Letters Patent No. 607,143, dated July 12, 1898.

Application filed April 19, 1897. Serial No. 632,789. (No model.)

*To all whom it may concern:*

Be it known that I, ANTHONY M. STOLTZ, of St. Paul, Ramsey county, Minnesota, have invented certain Improvements in Apparatus for Heating and Moistening Soil, of which the following is a specification.

My invention relates to improvements in the method of and apparatus for heating and moistening the soil of plant-beds in hothouses, &c.

To this end my invention consists in subjecting the soil of the bed to a constant supply of heated moisture, whereby the soil is furnished with the necessary amount of heat and is also kept in the proper moistened condition.

I preferably carry out my improved method by means of the construction shown, which consists of a tank arranged in the bench underneath the soil of the bed and separated therefrom by wire or other meshing, the tank being filled with water, in which are arranged steam or hot-water pipes, by means of which the water is vaporized to heat and moisten the soil and thus prevent the same from drying out. The specific construction of the apparatus may, however, be altered without departing from the idea of my invention, which is to subject the soil to a constant supply of heated moisture for the purpose of furnishing the requisite amount of heat and also keeping the soil in the proper moistened condition.

My invention further consists in the specific construction and combination hereinafter more particularly described and claimed.

In the accompanying drawings, forming part of this specification, Figure 1 is a plan view of the preferred construction of apparatus for carrying out my improved process. Fig. 2 is a side elevation of the same, and Fig. 3 is an end view thereof.

In the drawings, A represents the bench for supporting the plant-bed, provided with suitable legs or standards 2, the bench preferably standing in tilted position, as shown. Within the bench is arranged a sheet-metal tank B, provided at desired intervals with transverse partitions 3 to prevent the contained water flowing to the lower end of the tank. One or more conducting-pipes 4, connected with a source of steam or hot-water supply, are passed through the tank to heat and vaporize the water. The soil 5 of the bed is supported above the tank by means of the meshing 6, secured at its ends upon suitable supports 7 and resting upon intermediate transverse supporting-rods 8. A suitable opening 9 is provided through which water may be poured into the tank, the opening being preferably closed by a cover 10.

It will be evident that by regulating the supply of steam or hot water in the conducting-pipes the water in the tank may be kept at the necessary temperature to vaporize the water and thereby keep the soil in the desired heated and moistened condition. With the ordinary method of heating plant-beds, which consists of subjecting the same to heated air, the soil becomes dried out and the growth of plants retarded.

With the use of my improved method the soil, by being supplied with any desired amount of heated moisture, may be kept in the proper condition for the best growth of the plants. Where the system is used in hothouses, it serves also to warm the building itself and keep the air moist.

I claim—

1. In combination, the bench, the water pan or receptacle therein, the pipes in said receptacle connected to a source of heat-supply, the wire-netting arranged above the pan, and the soil supported upon the netting and constituting a plant-bed.

2. In combination, the bench, the sheet-metal water-pan therein, having a series of transverse partitions, the heating-pipes in said pan extending through said partitions, the cross-bars above said pan, the wire-netting arranged thereon, and the soil supported upon said netting as and for the purposes set forth.

In testimony whereof I affix my signature in presence of two witnesses.

ANTHONY M. STOLTZ.

Witnesses:
H. S. JOHNSON,
MINNIE L. THAUWALD.